US008037595B2

(12) United States Patent
Dees et al.

(10) Patent No.: US 8,037,595 B2
(45) Date of Patent: Oct. 18, 2011

(54) HAIRPIN EXPANDER MACHINE FOR MANUFACTURING TUBE AND FIN HEAT EXCHANGERS WITH REDUCED TUBE DIAMETER

(75) Inventors: Dan Dees, Houston, TX (US); Eric Garza, Houston, TX (US); Stephen Merschat, Houston, TX (US); Sean Mosser, Spring, TX (US); Andrew Overturff, Katy, TX (US); Dale Stetson, Houston, TX (US); William Topper, Pinehurst, TX (US)

(73) Assignee: Goodman Global, Inc., Houston, TX (US)

( * ) Notice: Subject to any disclaimer, the term of this patent is extended or adjusted under 35 U.S.C. 154(b) by 8 days.

(21) Appl. No.: 12/485,370

(22) Filed: Jun. 16, 2009

(65) Prior Publication Data

US 2009/0307898 A1    Dec. 17, 2009

Related U.S. Application Data

(63) Continuation of application No. 12/139,379, filed on Jun. 13, 2008.

(51) Int. Cl.
 B23P 15/26    (2006.01)
 B21D 39/08   (2006.01)

(52) U.S. Cl. ............. 29/726.5; 29/726; 29/727; 29/523; 29/890.04; 29/890.044

(58) Field of Classification Search .................... 29/726, 29/726.5, 727, 523, 890.03, 890.039, 890.04, 29/890.043, 890.044, 890.045, 890.046, 29/890.047, 890.054; 165/177, 178, 179, 165/181, 182
See application file for complete search history.

(56) References Cited

U.S. PATENT DOCUMENTS

| 4,771,536 A | 9/1988 | Vanderlaan et al. |
| 4,780,955 A | 11/1988 | Stroup |
| 4,839,950 A | 6/1989 | Stroup |
| 4,850,101 A * | 7/1989 | McDonough et al. .......... 29/727 |
| 4,980,966 A | 1/1991 | Milliman et al. |
| 5,003,691 A | 4/1991 | Milliman et al. |
| 5,033,190 A | 7/1991 | Gray |
| 5,220,722 A | 6/1993 | Milliman |
| 5,233,853 A | 8/1993 | Milliman |
| 5,353,496 A | 10/1994 | Harman et al. |
| 5,379,624 A | 1/1995 | Harman et al. |
| 5,410,800 A | 5/1995 | Gray |
| 5,588,345 A | 12/1996 | Franks et al. |
| 5,632,080 A | 5/1997 | Harman et al. |
| 5,680,695 A | 10/1997 | Vetter |

(Continued)

OTHER PUBLICATIONS

International Search Report and Written Opinion of PCT/US2009/047400 dated Jul. 28, 2009.

Primary Examiner — Sarang Afzali
(74) Attorney, Agent, or Firm — Brett T. Cooke; Andrews Kurth LLP

(57) ABSTRACT

An improved hairpin expander machine equipped with a closed-loop-controlled hydraulically positioned bolster plate and a heat exchanger-holding fixture characterized by a full-length, continuous front plate, back plate, and side rails. The hairpin expander includes a novel heat exchanger bottom end plate clamping mechanism as part of the fixture. These features enable the hairpin expander to provide larger expansion ratios and exert greater forces with tighter control, which is required for producing heat exchangers with reduced diameter hairpin tubes according to a preferred embodiment of the invention.

3 Claims, 17 Drawing Sheets

U.S. PATENT DOCUMENTS

| | | | |
|---|---|---|---|
| 5,685,066 A * | 11/1997 | Mohrmann et al. | 29/723 |
| 5,752,312 A | 5/1998 | Harman et al. | |
| 5,752,313 A | 5/1998 | Gaffaney et al. | |
| 5,806,173 A | 9/1998 | Honma et al. | |
| 5,901,596 A | 5/1999 | Tetzloff et al. | |
| 5,927,175 A | 7/1999 | Franks et al. | |
| 6,176,006 B1 | 1/2001 | Milliman et al. | |
| 6,354,126 B1 | 3/2002 | Small et al. | |
| 6,405,428 B1 | 6/2002 | Mun | |
| 6,494,353 B2 | 12/2002 | Small et al. | |
| 6,644,079 B2 | 11/2003 | Harman et al. | |
| 7,117,584 B2 * | 10/2006 | Nakadeguchi et al. | 29/727 |

* cited by examiner

HAIRPIN EXPANDER MACHINE FOR MANUFACTURING TUBE AND FIN HEAT EXCHANGERS WITH REDUCED TUBE DIAMETER

CROSS REFERENCE TO RELATED APPLICATION

This application is a continuation of U.S. patent application Ser. No. 12/139,379 filed on Jun. 13, 2008, the priority of which is claimed.

BACKGROUND OF THE INVENTION

1. Field of the Invention

This invention relates generally to tube and fin heat exchangers, and in particular, to manufacturing processes and equipment for producing tube and fin heat exchangers, such as for HVAC systems.

2. Description of the Prior Art

As illustrated in FIG. 1, a typical tube and fin heat exchanger (10) consists of a stack of generally planar metallic fins (12) sandwiched between a top end plate (14) and a bottom end plate (16). The terms "top" and "bottom" used for designating heat exchanger end plates are derived based on the heat exchanger orientation during expansion in a vertical hairpin expander press, as described below. The "top" and "bottom" designations are not necessarily indicative of the heat exchanger orientation in any particular installation.

The fins (12) have a number of collared holes (18) formed therethrough, and the top and bottom end plates (14, 16) have corresponding holes (20) formed therethrough. When the fins (12) and end plates (14, 16) are stacked, the holes (18, 20) are in axial alignment for receiving a number of U-shaped hairpin tubes ("hairpins") (22) through the stack. Hairpins (22) are formed by bending lengths of small tubes, typically copper, aluminum, steel or titanium, 180 degrees around a small diameter mandrel. The hairpin tubes (22) are fed, or laced, through the loosely-stacked assembly of fins from the bottom end plate (16) so that the open ends (26) of the hairpin tubes (22) extend beyond the top end plate (14). The top end plate (14) is slipped over the open ends (26) of the hairpins (22), and the hairpins (22) are mechanically expanded from within to create a tight fit with the fins (12). Finally, return bend fittings (24) are soldered or brazed to the open ends (26) of the hairpin tubes (22) to create a serpentine fluid circuit through the stack of fins (12).

FIG. 2 is a flow chart diagram that describes the manufacturing process of prior art used to mass produce tube and fin heat exchangers. Referring to both FIGS. 1 and 2, as shown in step (50), fins (12) are formed by a stamping process in a fin press, such as those produced by Burr Oak Tool, Inc. of Sturgis, Mich. Fin stock is delivered to a press in a roll of sheet metal. Various metals, heat treatments, and thicknesses may be used, but aluminum is the general industry selection. Fin stock is paid out from an uncoiler, lubricated, then fed through a press, where a die draws, details, punches collared holes, and cuts fins to a desired length and width. Stamping generally occurs in several stages. At the back end of the fin press, fins index out of the die under a vacuum hood, where a pressure differential holds them in place until discontinued, at which time (sometimes mechanically assisted by wire) the fins drop from the vacuum hood on to collection rods that pass through collared holes of the fins. The collection rods are mounted on to collection tables. Once having a full stack of fins, the collection table is removed from the back-end of the fin press. Drop rods are inserted into the fin stacks to keep the stacks intact. Operators lift stacks of fins by placing their hand at the bottom of the stack and physically lift the stack up off the collection table rods. Fin stacks then are staged for the lacing process as depicted by element (56) in FIG. 2.

As shown by step (52) in FIG. 2, the heat exchanger top and bottom end plates (14, 16) are manufactured in a stamping process that is independent of the fin stamping process (50). The end plates are typically made of a fairly stiff sheet metal. The end plates (14, 16) may also each include bends that form a channel or similar profile to provide strength and rigidity. Holes (20), which align with the collared holes (18) of the fins (12), are punched through the end plates by a press and die.

The hairpin tubes (22) are manufactured in process step (54). Referring to FIGS. 2 and 3, hairpins are typically formed in a hairpin bender machine (88), using machines such as vertical bend hairpin bender, manufactured by Burr Oak Tool, Inc. of Sturgis, Mich., to form multiple hairpins at a time. Depending on the outer diameter of the stock tubing, commonly up to six lines of tubing are typically processed simultaneously in a single hairpin bender machine (88).

A typical vertical bend hairpin bender machine (88) consists of three sections—the tubing pay-out section (90), a feeder section (92), and a bender section (94). U.S. Pat. No. 6,354,126, issued to Small, et al. and entitled "Tube Straightener and Drive Therefor," describes a typical feeder section (92), and the patent is incorporated herein in its entirety by reference. U.S. Pat. No. 5,233,853, issued to Jones G. Milliman and entitled "Stretch Straightening Hairpin Bender," describes a typical bender section, and it is also incorporated herein in its entirety by reference.

The pay-out section (90) includes a coil stand (96), also known as an uncoiler, for supporting multiple tubing spools or bare-pack tubing coils. As stock tubing (100) is paid out from bare-pack coils or spools at the pay-out section (90), the stock tubing (100) will typically contain bends and may be out-of-round at times. Thus, the feeder section usually includes correction rollers for reforming the stock tubing back to nominal dimensions.

A more detailed view of the feeder section is shown in FIG. 4. Cross-axis rollers (102) correct ovality, eccentricity, and out-of-round conditions of the stock tubing (100), returning it to a circular profile. Next, a pair of pre-size rollers (104) typically surrounds and rolls the stock tubing (100) to return any portion of stock tubing that has a slightly larger than normal outer diameter to its nominal size. In other prior art hairpin bender configurations, a stationary pre-sizing die (not illustrated) is used in place of the pre-size roller pair (104). A final pair of offset straightening rollers (106) ensures the stock tubing (100) is straight and true.

After the trio of correction rollers (102, 104, 106), a pair of conveyor belts (108) clamps the stock tubing and drives the tubing through the hairpin bender machine (88). Each line of stock tubing (100) being processed by the hairpin bender (88) is fed by the feed belt assembly (108) over a boom (110), a bend arbor clamp (112) and mandrel tip rods (114) in bender section (96). Tube draw for each tubing line continues until that tubing contacts a switch tower. Once all of the tubes have contacted their respective switch tower, the bend arbor clamp (112) engages and a tube cutter head assembly (98), located at the end of the feeder section (92), cuts and reams the tubes. Mandrel tips are extended, and boom (110) actuates, bending the cut tube sections 180 degrees about a mandrel (115), thus creating the hairpin tubes (22). Once the boom (110) actuates its limit switch (not shown), indicating a complete bend, the bend arbor clamp (112) is released, and a stripper assembly (not illustrated for simplicity) pushes the hairpin tubes (22) out of the boom (110) and off of the mandrel tip rods (114), where the hairpins (22) then fall into catch arms (also not illustrated for simplicity). The hairpins (22) are removed from the catch arms and staged in large racks for the lacing process as depicted by element (56) in FIG. 2.

As shown in step (56) of FIG. 2, the lacing process is that process in which stacks of fins (12), the bottom end plate (16), and the hairpins (22) are assembled together, typically by hand. Fin stacks are laid out on a lacing table, one stack at a time. Drop rods are removed from each fin stack as multiple stacks are assembled together on the table to form a contiguous slab of fins. The heat exchanger bottom end plate (16) is added to one end of the slab, and it is temporarily held in place with rods. These rods also help maintain fin alignment until an adequate number of the hairpin tubes have been laced through the assembly to maintain alignment. Hairpins (22) are typically hand-laced through the bottom end plate (16) into the slab of fins (12) one at a time by an operator who manually finesses them in. For conventional diameter hairpins and fins of the prior art, for example ⅜ inch diameter hairpins, lacing is a simple process, taking on average no more than five seconds per hairpin.

At this stage of assembly, the heat exchanger consists of stacks of fins (12) and a bottom end plate (16) loosely held together by hairpins (22) passing transversely through the assembly. As shown in step (58) of FIG. 2, in order to form tight metal-to-metal interfaces between the tubes and the fins of the heat exchanger so that efficient conductive heat transfer paths are created between the tubes and the fins, the hairpins (22) are expanded within the fins to create an interference fit.

The laced heat exchanger assembly is placed within a hairpin expander machine (150), and the top end plate (14) is slipped over the open ends (26) of the hairpins (22). FIG. 6 shows a typical hairpin expander (150) of prior art into which a heat exchanger assembly is vertically placed with the open ends (26) of the hairpins (22) facing upwards. Referring to FIGS. 1 and 6, hairpin expander (150) has bullets (152) located at the ends of long rods (154) for passing through the open ends (26) of the hairpins (22). Multiple bullets (152) and rods (154), two for each hairpin (22), are typically provided for simultaneously expanding all of the hairpins (22). Each bullet (152) is sized to have an outer diameter larger than the inner diameter of the hairpin tubes (22). The expander has a hydraulic ram (151), that acts upon a pressure plate (153) which in turn drives rods (154). As the expander (150) presses the bullets (152) into the hairpins (22), the bullets (152) expand the hairpins (22) into a tight, interference-fit engagement with the fins (12).

Expansion of the diameter of the hairpins causes axial shrinkage of the hairpins. Typically, about a 3-5 percent reduction in hairpin length occurs during the prior art expansion process used with conventional hairpin tube diameters (e.g. ⅜ inch). In the earlier vintage hairpin expanders (150), the heat exchanger stack is supported in the expander at the bottom end plate (16) and at the bends (23) of the hairpins (22) by a bolster plate (156). The hairpin bends (23) are supported by a receiver plate or cradle plate (158) that has semicircular grooves (161) cut therein to accommodate them. The receiver or cradle plate (158) is in turn supported on the bolster plate (156). The stack of fins (12) and the top end plate (14) "float" or rest on the bottom end plate (16). As the hairpins are expanded, the hairpins (22) are under compressive forces. Therefore, expander (150) includes a fixture (160) mounted to the expander frame, into which the heat exchanger is placed. Fixture (160) includes front and back plates (162) that laterally support the stack of fins (12) to prevent them from buckling during the expansion. Side rails (164) may be included in fixture (160) for making it easier to center the heat exchanger within the expander (150).

Because the top end plate (16) becomes initially fixed in position near the tips (26) of the hairpins (22) after expansion is first commenced, there is a concomitant shrinking and tightening of the stack of fins and end plates due to the longitudinal shrinkage of the hairpins (22) during expansion. Even with attempts to predict and compensate for the shrinkage of the hairpins with this type of expander, the process still results in heat exchangers having large dimensional variances.

The more advanced expanders of prior art employ a coil shrink rate control feature that forces all of the hairpin tubes to shrink at the same rate. With this type of expander, both the top and bottom end plates (14, 16) are held fixed within the fixture (160) at the desired dimensions, thus providing a finished heat exchanger product of having higher dimensional tolerances. The hairpin bends (23) are supported in a cradle or receiver plate (158), which is in turn supported by the bolster plate (156). During initial expansion, the hairpins (22) are in compression. However, because the top end plate is held fast within the fixture (160), after the bullets have passed through the top end plate (14), securing the top end plate near the upper ends (26) of the hairpins (22), the compressive hairpin force becomes a tensile force as the hairpin bends (23) contract and pull away from the cradle or receiver plate (158). The hairpins (22) are held by the top end plate (14) in the fixture (160) during expansion, and as the hairpins (22) contract in length, the hairpin tubing below the bullets (152) slide upwards within the stack of fins (12), moving the hairpin bends (23) toward the bottom end plate (16).

It is possible that the tensile force exerted on the hairpins (22) at the top end plate (14) by the bullets (152) during expansion may exceed the strength of the interference fit that holds the hairpins (22) in the holes (20) of the top end plate (14). If this happens, damage to the heat exchanger will occur. Therefore, with the controlled-shrink-rate expander, the bolster plate (156), which carries the cradle or receiver plate (158), is designed and arranged to move upwards at the same rate as the hairpin bends (23) move upwards, thus continuing to provide support of the hairpins.

U.S. Pat. No. 4,780,955 issued to Stroup on Nov. 1, 1988 and entitled "Apparatus for Making a Tube and Fin Heat Exchanger" describes an expander that employs coil shrink rate control, and the patent is incorporated herein in its entirety by reference. The '955 patent teaches that the bolster plate may be mechanically driven as a function of the position of the ram cylinder that drives the pressure plate, the rods and the expansion bullets. For example, for every inch of downward travel of the ram cylinder, a cam arrangement (not illustrated) drives the bolster upward 0.03 inches. The '955 patent also discloses a second arrangement in which a pneumatic actuator (not illustrated) drives the bolster plate upward. The pneumatic actuator force is manually selected by the operator so as to approximately balance the force applied to the hairpins by the bullets.

In the controlled-shrink-rate expander of prior art described above, the upward movement of the bolster plate and receiver or saddle plate tends to apply an upward force on the heat exchanger bottom end plate. The bottom end plate of the heat exchanger is held fast within the expander fixture by a piano hinge clamp arrangement, as illustrated in FIGS. 7-8. FIG. 7 illustrates the bottom end of a heat exchanger (10) that is to be positioned within the expander for expanding the hairpins into an interference-fit engagement within the stack of fins (12). The hairpin bends (23) are shown extending beyond the bottom end plate (16) of the laced heat exchanger.

The heat exchanger fins are not illustrated for simplicity. Fixture base plate (165) receives and positions the heat exchanger bottom end plate (16) during the shrink-rate-controlled expansion process described above. Base plate (165) may have a recessed seat (166) into which bottom end plate (16) is received. A slot (167) is formed through base plate (165) for allowing the hairpin bends (23) to pass therethrough and to be received into the receiver or cradle plate (158). Two piano hinge clamps (168) (only one is shown for simplicity) are attached to fixture base plate (165) and are arranged to be folded over the seated bottom end plate (16), retaining the bottom end plate (16) in the recessed seat (166) of the fixture plate (165). A pair of latch mechanisms (170) are secured to studs (172) in fixture plate (165). The latch mechanisms (170) are rotatable for locking the piano hinge clamps (168) into the folded clamping position or for allowing the piano hinge clamps (168) to swing freely.

FIG. 8 illustrates the piano hinge clamp arrangement of the fixture base plate (165) of FIG. 7, with the heat exchanger bottom end plate (16) seated in the recessed seat (166) of the base plate (165). The piano hinge clamps (168) are folded over the heat exchanger bottom end plate (16), holding the end plate fast to fixture base plate (165). The latches (170) are rotated to keep the piano hinge clamps (168) in the downward, folded position.

Referring back to FIGS. 1 and 2, after the expansion process, a number of short return bend tubes (24) are soldered, brazed or welded to the open ends (26) of the hairpins (22) to create one or more long serpentine circuits from the hairpins for fluid flow. Additionally, one or more cross-over tubes (not shown), which connect various hydraulic circuits, may be soldered, brazed or welded to the open ends (26) of the hairpins (22). In the typical manufacturing process used for manufacturing prior art ⅜ inch tubing heat exchangers, for example, the return bends (26) and the cross-over tubes are brazed to the heat exchanger (10) in an autobrazing process, depicted as step (60), in the flowchart of FIG. 2. The tubes are hand-assembled with brazing rings, and the heat exchanger is run through a furnace, wherein the joints are brazed.

After the autobrazing step (60) in the heat exchanger manufacturing process of prior art, a leak check (62) is performed. For each circuit, one end is plugged while a pressure-decay monitoring device is connected to the other end. If the circuits hold pressure, there are no leaks.

Finally, for heat exchangers used in HVAC systems, in step (64), subcooler, liquid and suction manifolds are manually brazed to the heat exchanger circuits.

There is concern with the effects of R22 refrigerant in depleting the ozone layer, and so the new HVAC systems are designed to use R410 refrigerant. R410 refrigerant systems operate at higher pressures than their R22 counterparts. Higher operating pressure allows the use of smaller diameter tubing in heat exchanger coils of condensers and heat pumps. Smaller diameter tubing provides a better ratio of heat transfer surface areas, has merits in terms of pressure drop on the air side because of reduced form drag, and requires less material to provide the same amount of heat transfer surface area, which is especially attractive from a commercial perspective. Consequently, strong desire exists among HVAC manufacturers to design manufacturing processes capable of realizing small diameter product. The current industry standard diameter is ⅜ inches, although some manufacturers use 7 mm. Other manufacturers use 5 mm coils to produce heat exchangers having short lengths, for example no longer than 36 inches. However, when the hairpin tubing becomes too small, both the lacing process and the expansion process become exceedingly difficult, and commercially viable manufacturing of any but the smallest heat exchangers has previously not been possible. For example, heat exchangers six or more feet in length are readily manufactured using ⅜ inch copper tubing. However, when 5 mm copper tubing is used, before the present invention, it has not been commercially feasible to manufacture a heat exchanger longer than about 36 inches—the 5 mm copper tubing is too flimsy to readily lace and expand long heat exchangers, and the concomitant manufacturing time is too long to justify the expense of producing the 5 mm heat exchanger.

It is desirable, therefore, to provide a manufacturing process and system that allows tube and fin heat exchangers characterized by small diameter hairpin tubing, such as 5 mm copper tubing, to be quickly, easily, and cost-effectively manufactured.

IDENTIFICATION OF THE OBJECTS OF THE INVENTION

A primary object of the invention is to provide a manufacturing process that allows tube and fin heat exchangers of long length to be manufactured using 5 mm or smaller tubing.

Another object of the invention is to provide pre-lacing hairpin tubing sizing apparatus for use in the above 5 mm manufacturing process.

Another object of the invention is to provide an expander apparatus for use in the above 5 mm manufacturing process.

Another object of the invention is to provide an apparatus that modifies existing tube and fin heat exchanger manufacturing equipment to be capable of manufacturing 5 mm heat exchangers.

Another object of the invention is to provide an improved lacing table for use in the above 5 mm manufacturing process.

Another object of the invention is to provide an autobrazing process for the above 5 mm manufacturing process in which return bends, cross-overs, and all HVAC manifolds are brazed in one step.

Another object of this invention is to provide a pressure test to determine blockages within the heat exchanger fluid circuits.

SUMMARY OF THE INVENTION

The objects above as well as other features of the invention are realized in an improved method for manufacturing tube and fin heat exchangers that, according to a preferred embodiment, includes a process for reducing the outer diameter of stock tubing to a value well below nominal prior to bending the tubing into hairpins. The method uses pre-size rollers that are adjusted to reduce the diameter of the tubing. The reduction of diameter increases the stiffness of and imparts an ovality to the resultant hairpins that allows for efficient lacing of the heat exchanger fins and end plates.

The manufacturing process according to the preferred embodiment also includes expansion of the hairpin tubes with a high expansion ratio—for example, 8 to 9 percent. During this expansion, the hairpin tube bends are supported by a programmable, infinitely variable hydraulically actuated bolster plate that accurately controls the resultant forces imparted on the hairpin tubes.

In the preferred embodiment, the manufacturing process further includes a novel autobrazing step in which both return bend fittings and manifolds are simultaneously brazed to the hairpin tubes using high and low temperature brazing rings.

The preferred manufacturing process also includes a unique pressure test for determining tube blockage using a pressure decay tester.

The preferred embodiment of the invention includes an improved hairpin expander machine equipped with a closed-loop-controlled hydraulically positioned bolster plate, a heat exchanger-holding fixture characterized by a full-length, continuous front plate, back plate, and side rails. Preferably, the expander includes a novel heat exchanger bottom end plate clamping mechanism as part of the fixture.

The preferred embodiment of the invention also includes an improved lacing table and a hairpin storage bin assembly.

Finally, the invention includes heat exchanges with small diameter hairpin tubing manufactured according to the manufacturing processes disclosed herein.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 9:
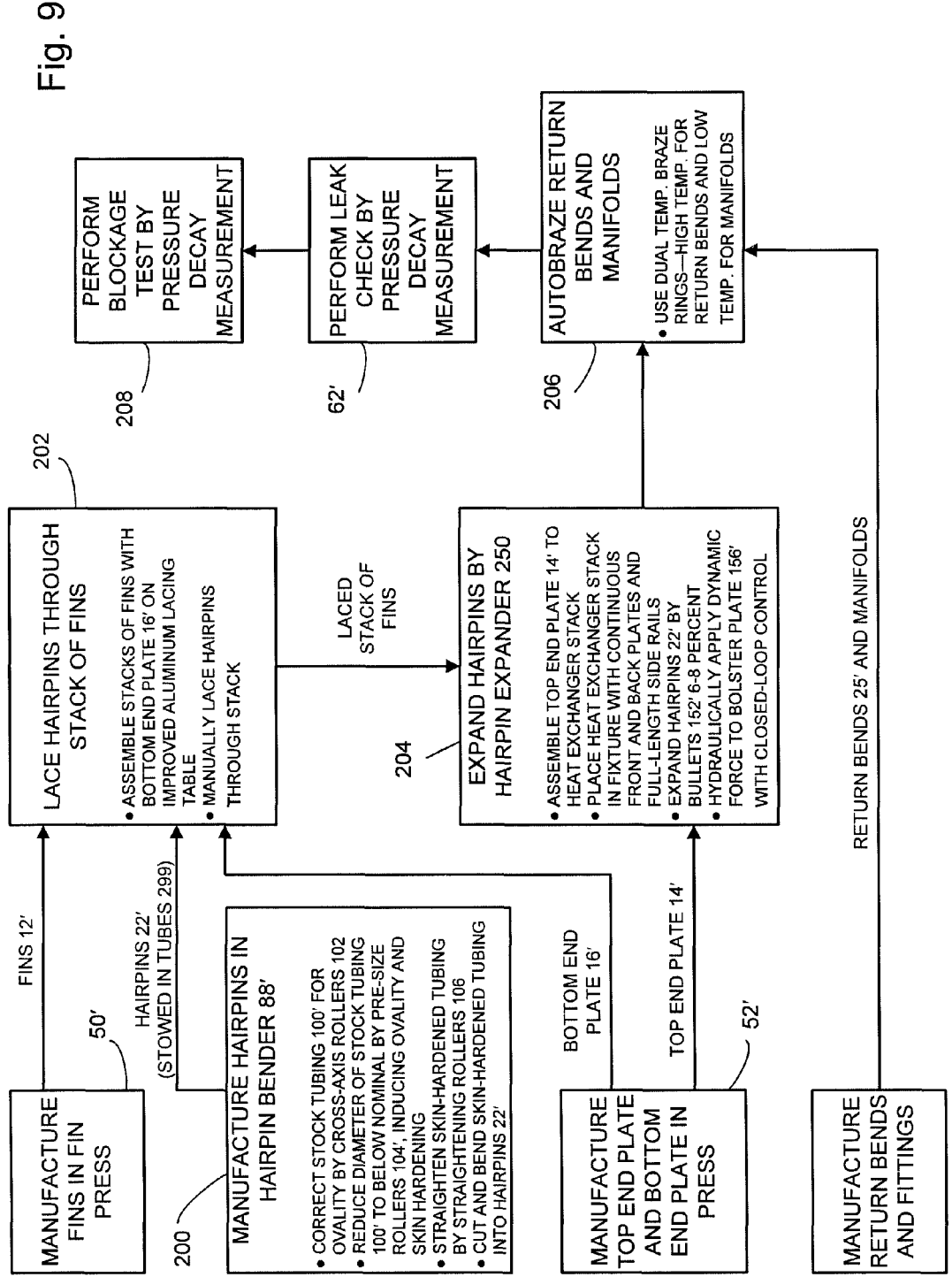
FIG. 9 is a flowchart diagram that describes the process for manufacturing heat exchangers having reduced hairpin diameters according to the preferred embodiment of the invention.

FIG. 9 is a flowchart diagram that describes the process for manufacturing heat exchangers having reduced hairpin diameters according to the preferred embodiment of the invention.

Figure 2:
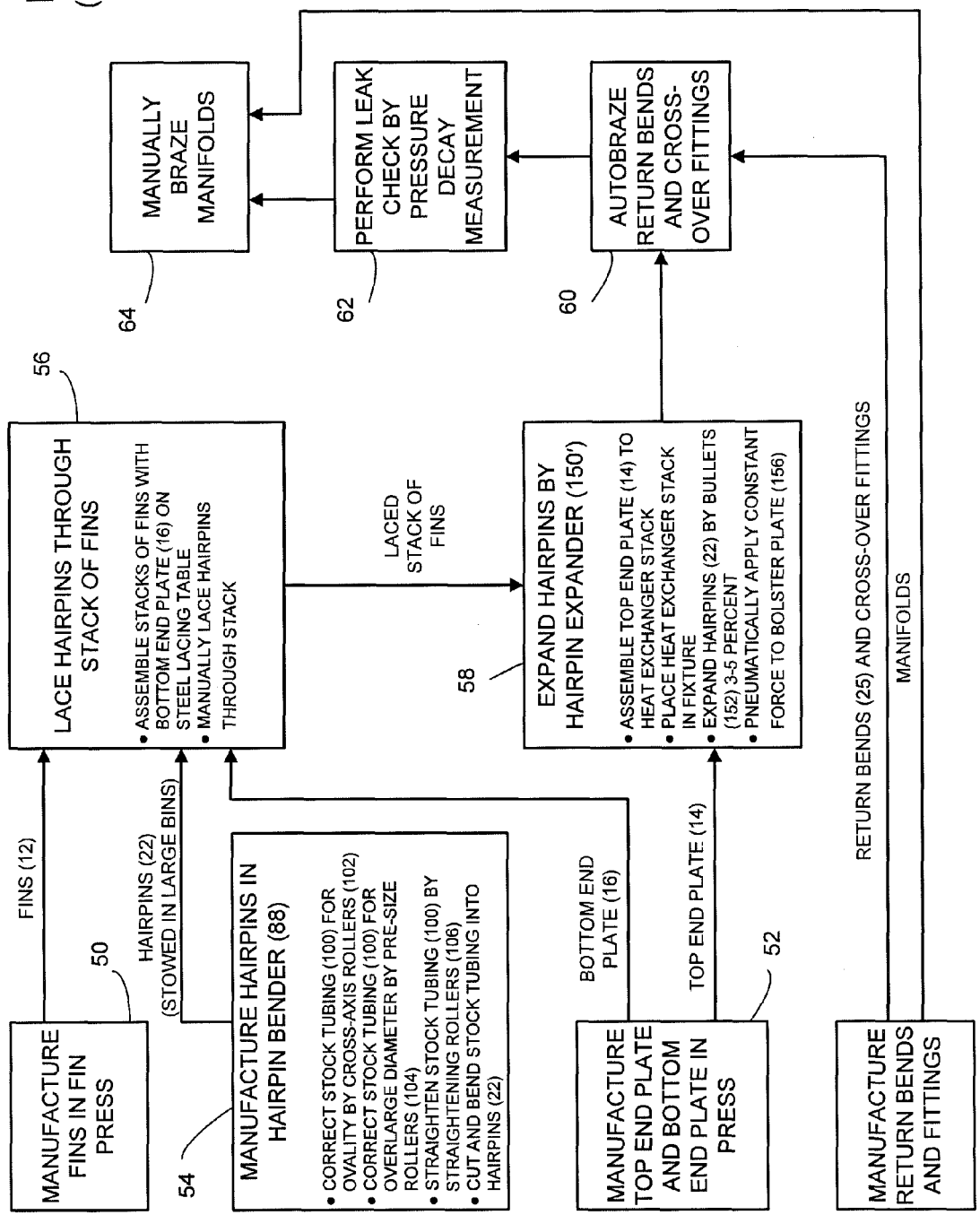
FIG. 2 is a flow chart diagram illustrating the prior art process for manufacturing tube and fin heat exchangers used for HVAC systems.

As shown in step 50' fins 12', adapted for small diameter hairpins 22' (such as, but not unnecessarily limited to 5 mm tubing) are produced by a fin press in the same manner as described in step 50 with reference to FIG. 2. Likewise, in step 52', heat exchanger top and bottom end plates 14', 16' are formed as known in the prior art and described above with reference to step 52 of FIG. 2, except that the end plates are dimensioned for hairpin tubes 22' of reduced diameter.

Figure 3:
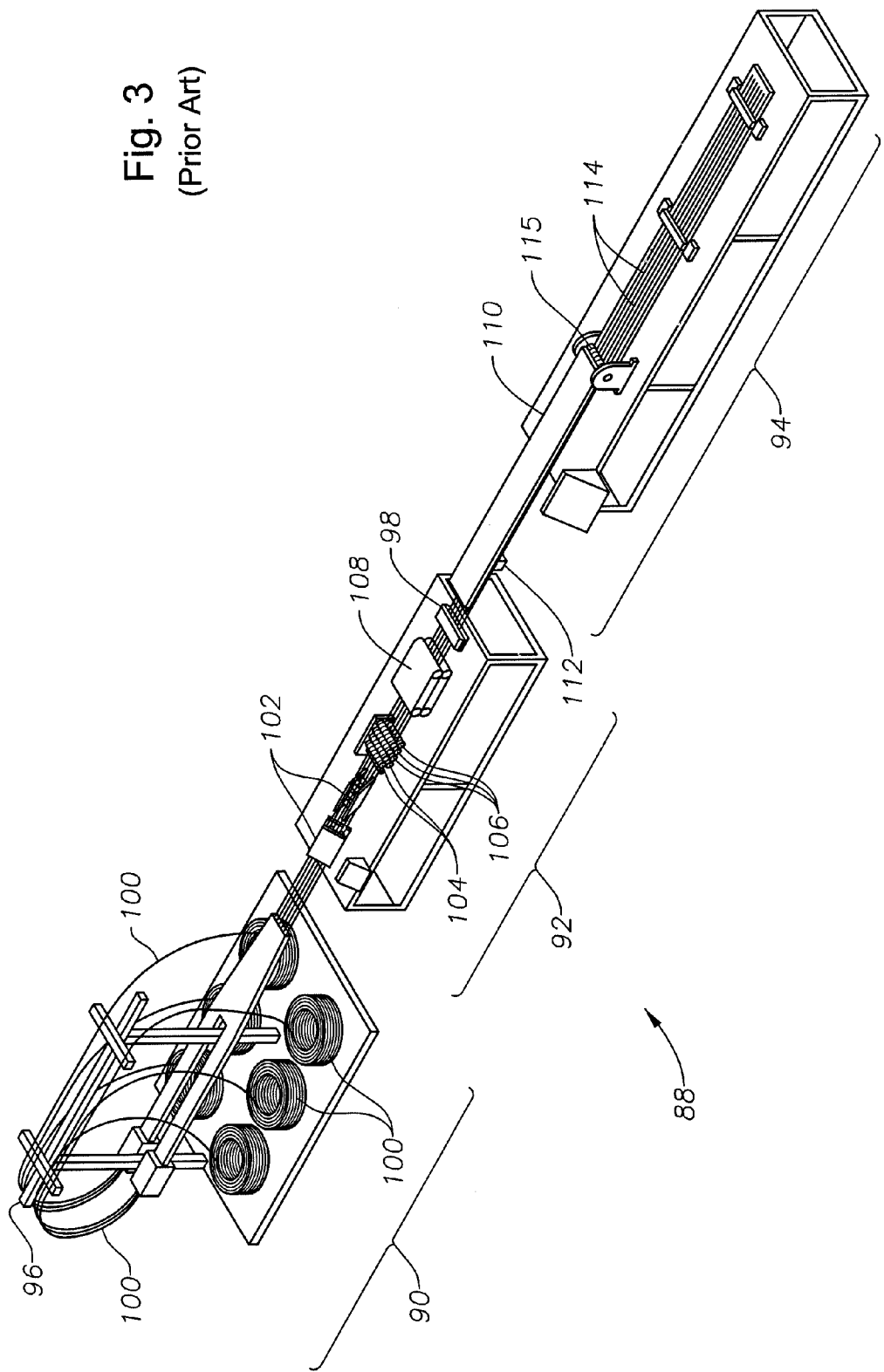
FIG. 3 is a perspective drawing that illustrates a typical hairpin bender machine of prior art, showing process equipment including an uncoiler, a series of correction rollers, a feed belt drive mechanism, a tube cutter and a tube bender.
Figure 4:
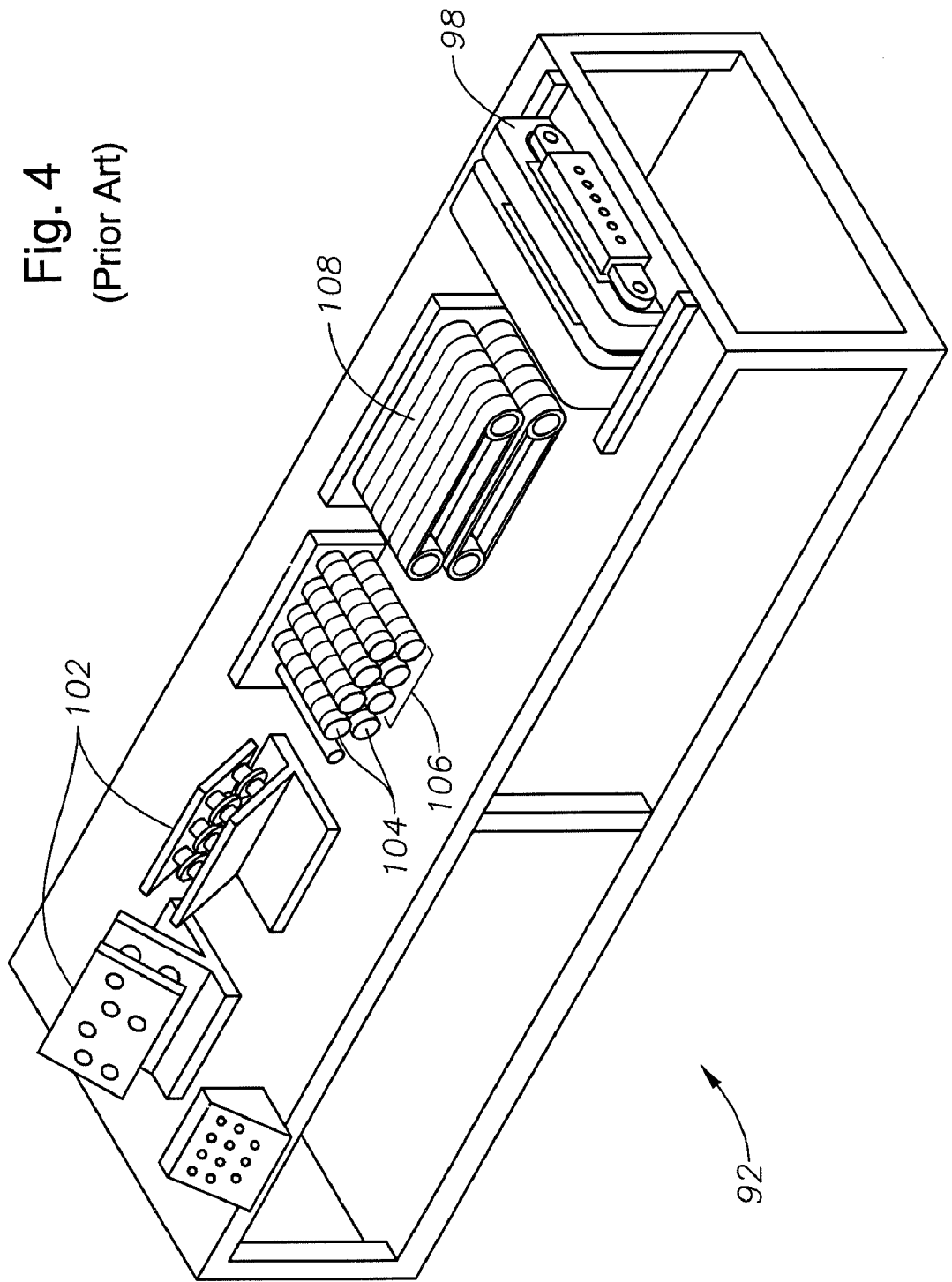
FIG. 4 is a larger scale perspective drawing of the feed section of the hairpin bender machine of FIG. 3, showing the cross-axis correctional rollers, pre-size rollers, straightening rollers, feed belt drive mechanism, and tube cutter.
Figure 5:
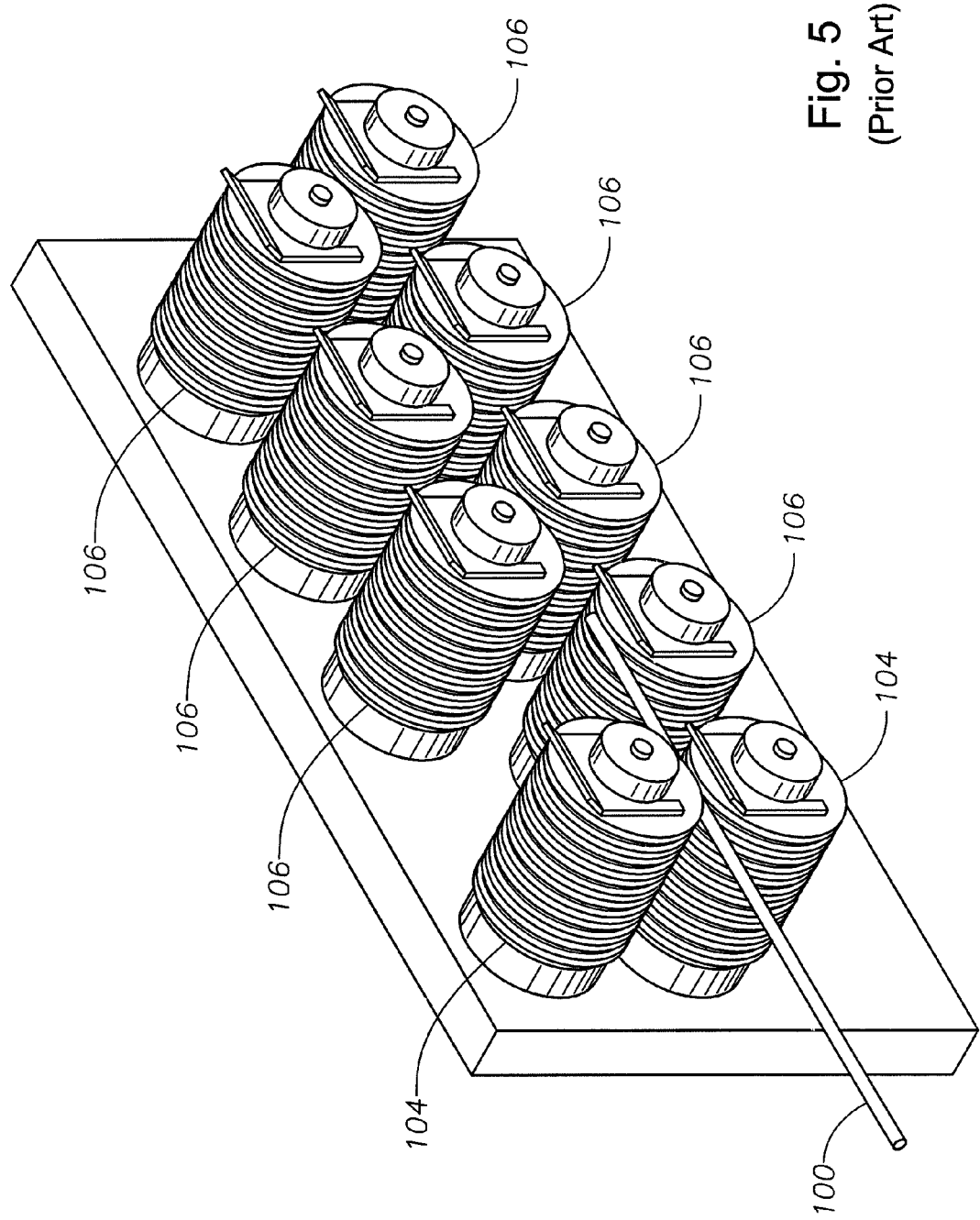
FIG. 5 is a detailed perspective view of the pre-size and straightening rollers of FIGS. 3 and 4, showing circumferential grooves within the individual rollers for receiving, sizing and straightening the tubing stock.

According to the preferred embodiment of the invention, a reduced hairpin diameter (e.g. 5 mm) tube and fin heat exchanger manufacturing process includes a novel and unobvious processing step 200 in forming the hairpin tubing. In the hairpin forming process of prior art as shown in FIGS. 3-5, the hairpin bender machines function by pulling raw non-skin-hardened tubing 10 from level wound bunch coils or from cardboard spools through a correction process that straightens the coiled tubing and corrects dimensional abnormalities such as eccentricity or oversized diameters. The correction process is typically carried out by a series of cross axis rollers 102, pre-size rollers 104, and/or straightening rollers 106 before the tubing is cut and bent. The tubing is pulled through the correction rollers by a feed belt drive 108 system that uses pneumatic cylinders to clamp the tubing between two opposing feed belts. As the feed belts turn, the tubing is pulled through the hairpin production line. A tube cutter 98 cuts the straightens tubing stock at predetermined lengths, and a tubing bender 94 bends the cut tubing around a mandrel 115.

In addition to or in place of the correction process of correcting dimensional abnormalities to the nominal tubing dimensions as known in the prior art, according to the preferred embodiment of the invention, the non-skin-hardened 5 mm tubing stock 100' is passed through the pre-size rollers 104', but the pre-size rollers 104' are positioned to reduce the outer diameter of the tubing stock 100' to a dimension that is significantly smaller than its nominal diameter. For example, tubing stock measuring 5.05 mm is sized down to 4.86 mm (a 3.8% reduction) in pre-size rollers 104'.

Figure 10:
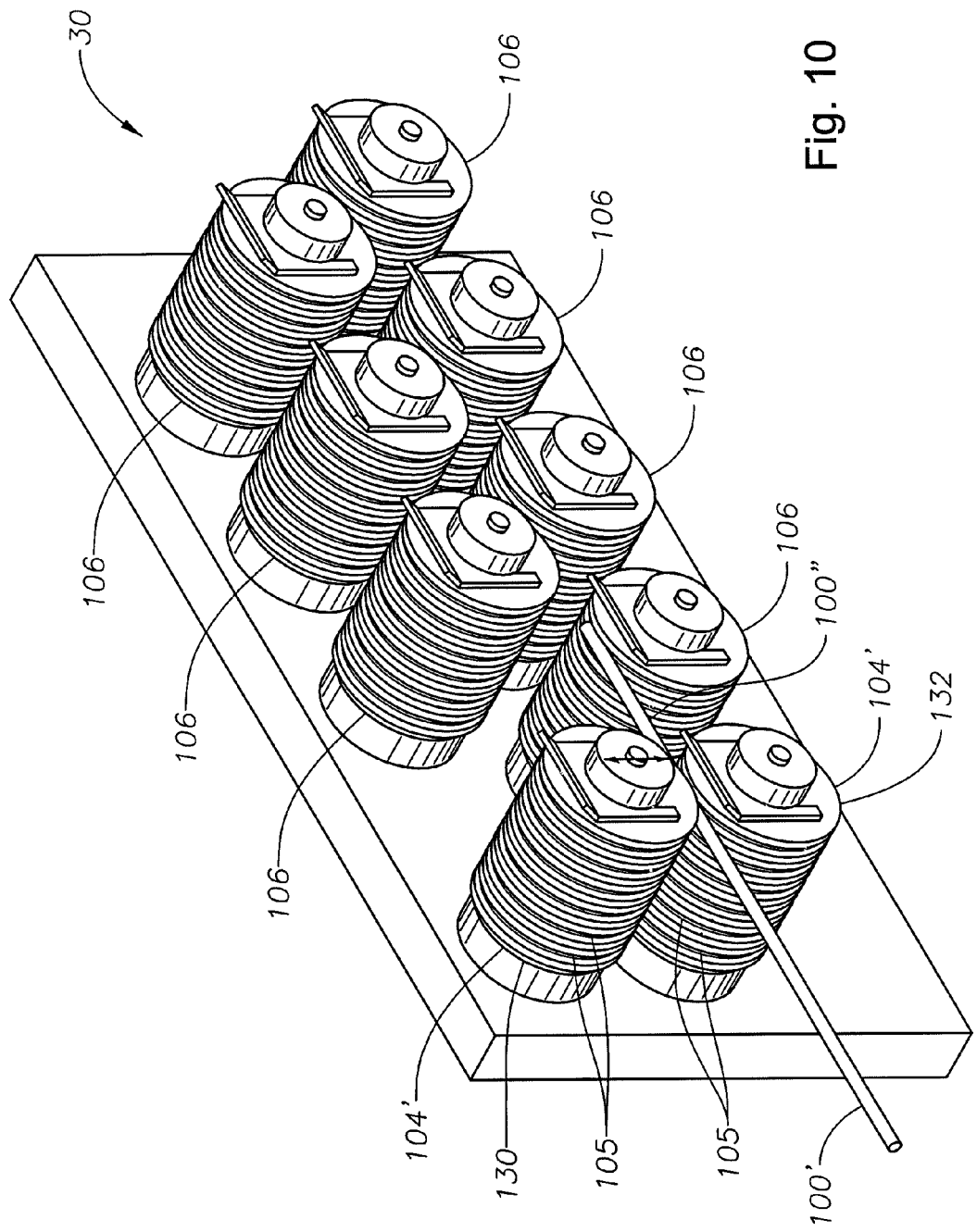
FIG. 10 is a detailed perspective view of pre-size rollers in a hairpin bender machine according to a preferred embodiment of the invention in which the pre-size rollers are set to reduce the outer diameter of stock tubing to a value below its nominal value.

FIG. 10 is a more detailed view of the pre-size rollers 104' according to the preferred embodiment of the invention. Preferably, the pre-size rollers 104' are located prior to the drive belt system 98, but they may be located after the drive belt system 98 as desired. The pre-size rollers 104' include one or more upper rollers 130 and one or more lower rollers 132. The distance between the upper rollers 130 and the lower rollers 132 is selectively adjustable so that the resultant outer diameter of the tubing exiting the pre-size rollers 104' can be precisely adjusted and controlled. Preferably, a dial indicator or like gauge (not shown) is provided so that precise adjustments in the roller positions can be measured. Each individual roller 104' includes a central groove 105 formed within its circumference into which the 5 mm tubing stock 100' is received. Pre-size rollers 104' squeeze tubing stock 100', producing tubing 100" having an outer diameter to a value significantly below nominal. This diameter reduction is the first feature of the manufacturing process according to the preferred embodiment of the invention that results in an improved ability to lace long stack of fins 12' with 5 mm or smaller hairpins 22'.

In addition to the reduction in hairpin diameter, the action of the pre-size rollers 104' results in a skin hardening of the tubing 100" (and hence the hairpins 22'), which is a second feature of the process according to the preferred embodiment of the invention that results in an improved ability to lace long stacks of fins 12' with 5 mm or smaller hairpins 22'. For example, using 5 mm copper tubing, a 2×2 full factorial Design of Experiments (DOE) has revealed that the cold-working of the copper tubing outer surface by the pre-size rollers 104' results in a case-hardened tubing 100", which in turn reduces cantilevered deflection of the hairpins 22', thus easing the lacing process 202. As an added benefit, the skin hardening also improves both the yield and burst strength of the hairpins 22', with the cost-saving result that a pressure switch may be eliminated from various HVAC system designs when using a heat exchanger manufactured according to the preferred embodiment.

Because pre-size rollers 104' have grooves 105 that are designed for use in returning oversized 5 mm tubing to its nominal diameter of 5.05 mm, using these pre-size rollers 104' to reduce the tubing diameter to 4.86 mm imposes a 0.05 mm ovality to the tubing. This resultant hairpin ovality reduces the area of contact of hairpin tube surface with the collared holes of the fins and is a third feature of the manufacturing process according to the preferred embodiment of the invention that results in an improved ability to lace a long stack of fins with 5 mm or smaller hairpins 22'.

Although it is preferred to reduce the diameter of the hairpin tubes using pre-size rollers 104', other means for reducing hairpin diameter may be used. Additionally, other means for creating oval hairpin tubing may be used and other means for skin or case hardening or tubing may be used as appropriate.

Figure 11:
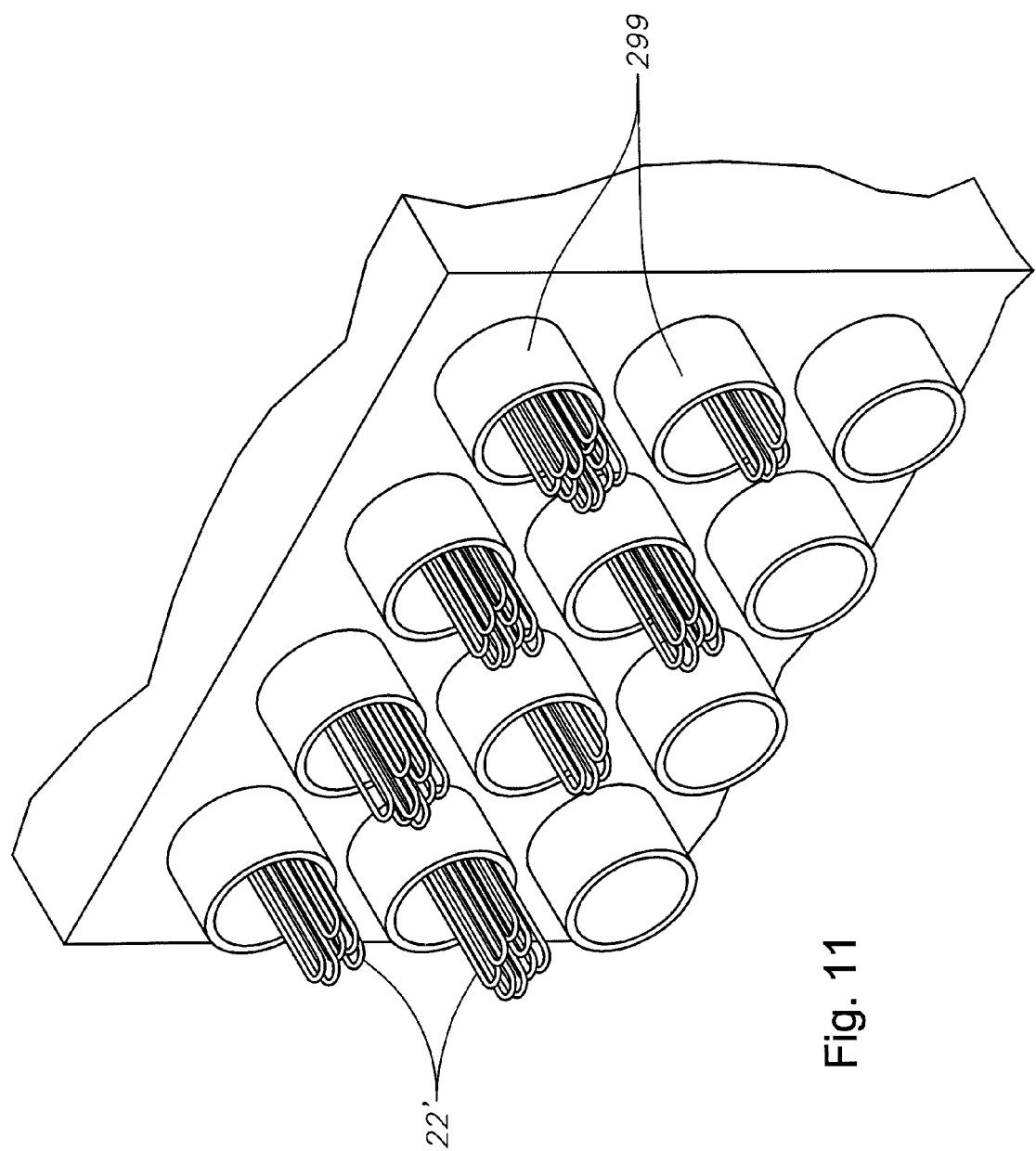
FIG. 11 is a perspective view of a hairpin storage rack according to a preferred embodiment of the invention, showing individual tubular compartments.

Referring to FIG. 11, once the hairpins 22' are manufactured, they are preferably staged in tubes 299 or other segmented racks to limit the number of small diameter hairpins 22' that may be stacked one upon another. This compartmentalization protects the hairpins 22' from damage and maintains their dimensional integrity.

Figure 12:
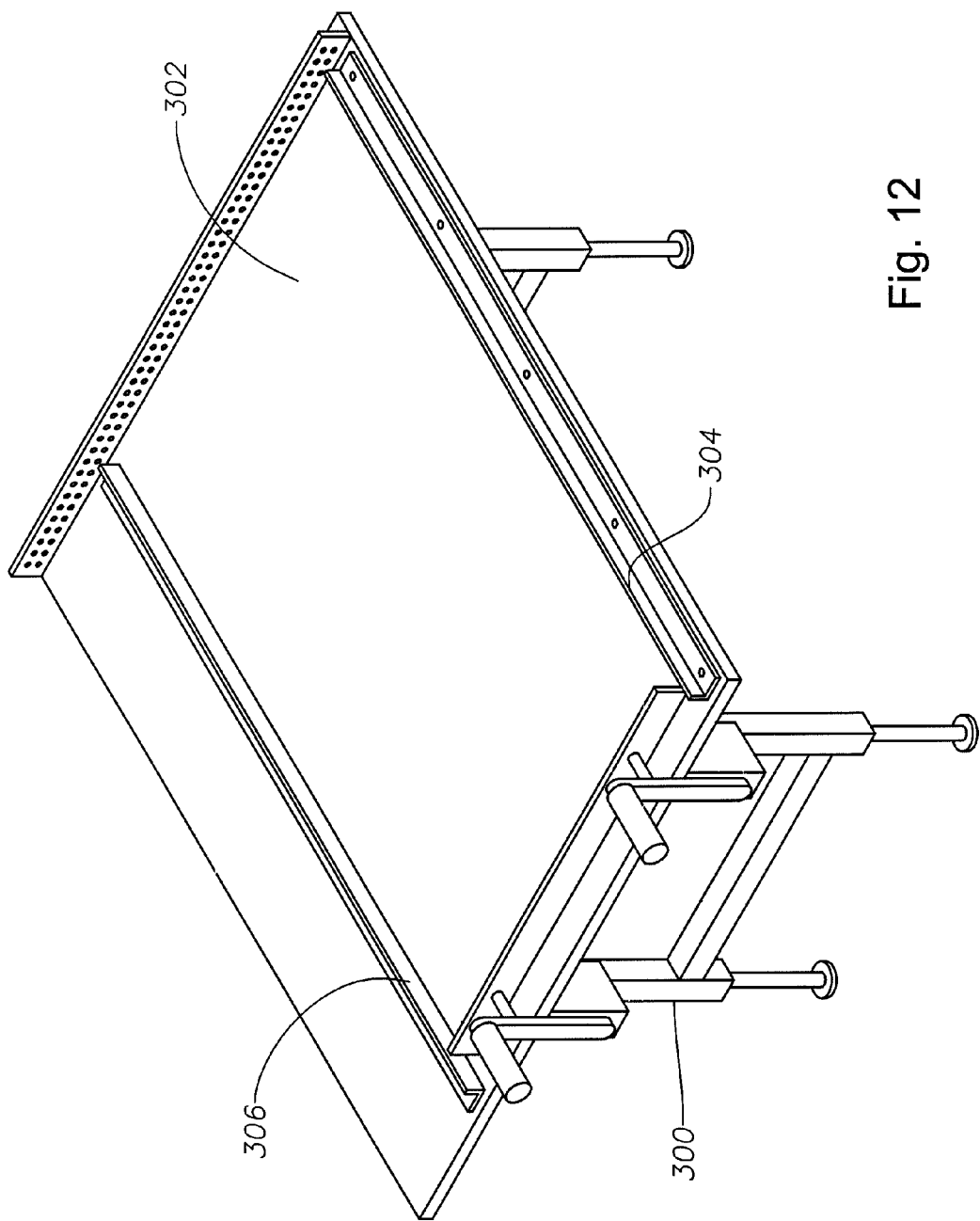
FIG. 12 is a perspective view of an aluminum lacing table according to a preferred embodiment of the invention having a specified table flatness and continuous side rails.

The lacing process is described in step 202 of FIG. 9, and an improved lacing table according to a preferred embodiment of the invention is shown in FIG. 12. Lacing tables for conventional (⅜ inch heat exchangers) are typically made from welded steel. Welding results in a slight warpage of the lacing table surface. While this warpage is insignificant for lacing ⅜ inch hairpins, the resultant misalignment of fin holes makes it difficult to lace long heat exchangers with 5 mm or smaller hairpins. According to the preferred embodiment, lacing table 300 is constructed of a special grade aluminum. Table 300 includes a horizontal surface 302 with a flatness held to within 0.001 inches across its width to reduce fin hole misalignment. Full length aluminum side rails 304, 306 are included to further assure fin hole alignment.

The expansion process according to the preferred embodiment is shown in step 204 of FIG. 9 and is accomplished by a novel vertical hairpin expander 250, as described below with reference to FIGS. 13 and 14. Because hairpins 22' have a diameter reduced below nominal, a greater expansion ratio must occur in order to create the required interference fit with the collared fin holes. Thus, relative to the size of the hairpins, larger hairpin forces are encountered during expansion. If the hairpin forces are not balanced by the bolster plate to within narrow parameters, failure will result.

Expander 250 is preferably a vertical hairpin expander, built by Burr Oak Tool, Inc. and modified by Crown Unlimited Machine, Inc., which is equipped to guide and assist the shrink rate of the hairpin tubes by moving the bolster plate a controlled distance as the expansion bullets pass through the hairpin tubes. For example, a Burr Oak model CDE-M387-3 vertical expander, with a tilting platform that allows horizontal loading and unloading of the heat exchangers, may be used. Expander 250 includes a ram cylinder 252 that moves a pressure plate 254, which in turn drives a number of rods 256 and bullets 258 (only one is shown for simplicity). A fixture 259 that includes a continuous front plate 260, a continuous back plate 261 (which is disposed directly behind front plate 260 in FIGS. 13 and 14), and left and right side rails 262, 264, respectively, hold the heat exchanger top and bottom end plates and stack of fins stationary within expander 250. A saddle 266 for supporting a hairpin bend is shown connected to a receiver plate 270, which in turn is carried by a bolster plate 272. Bolster plate 272 is moved up and down vertically by a hydraulic piston-cylinder arrangement 274 (FIG. 14) that is connected between bolster plate 272 and the expander frame 275.

Unlike the bolster plate actuators of prior art, actuator 274 is controlled by a closed loop control system that receives a position or force feedback signal, thus allowing accurate, infinitely variable programming of the bolster plate position. The hydraulic bolster control system preferably includes one or more position or force sensors 276 and a control system 278 (illustrated functionally as a labeled box) which is connected between the hydraulic actuator system 274 and the feedback sensor 276. Preferably, control system 278 is an electronic digital control system that uses a computer processor. As control systems are well known in the art, control system 278 is not discussed further herein.

Figure 13:
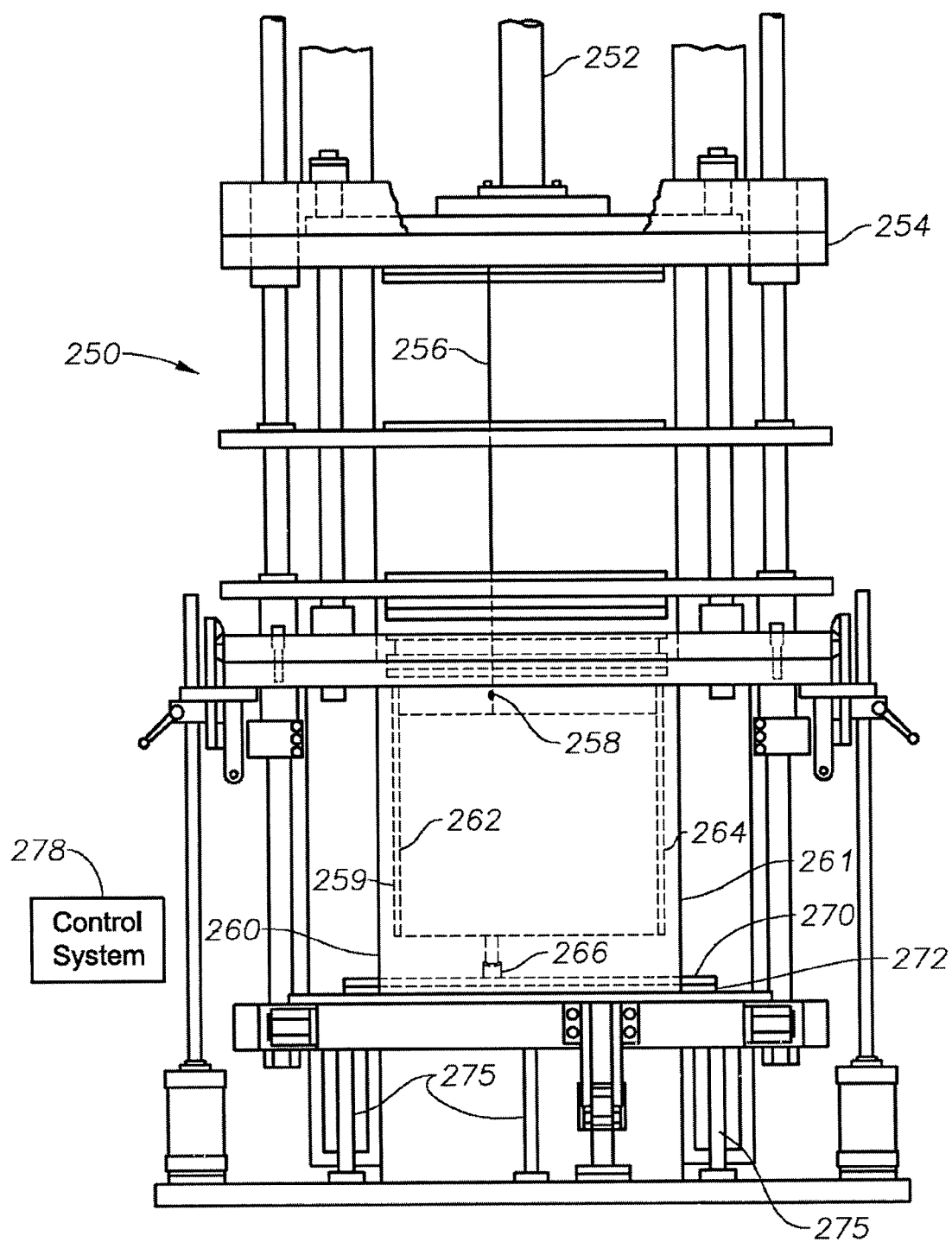
FIG. 13 is a front elevation of a controlled-shrink-rate vertical hairpin expander according to a preferred embodiment of the invention, shown with the expander bullets at a top end of their range of motion and a bolster plate at a bottom end of its range of motion.

As illustrated in FIG. 13, expansion has not yet occurred, and rods 256 and bullets 258 are at the top of their range of travel. Bolster plate 272, receiver plate 270, and saddle 266 are at their corresponding lowest point of travel. To expand the hairpins, ram 252 is actuated downwardly, driving pressure plate 254, rods 256 and bullets 258 downwardly. Simultaneously, according to a user-programmed profile, hydraulic bolster actuators 274 are driven upwardly according to signals generated by control system 278, with one or more feedback signals representative of ram 252 position or force, or bolster plate 272 position or force. As hydraulic bolster actuators 274 move upwardly, they drive bolster plate 272, receiver plate 270, and saddles 266 upwardly to balance the forces exerted on the hairpin tubes during the expansion process. FIG. 14 illustrates expander 250 after expansion has occurred, with bullets 258 at their lowest point of travel and bolster plate 270 at its uppermost point of travel. Because of the large expansion ratios (typically 8-9 percent) employed in the manufacturing process according to preferred embodiment of the invention, bolster plate 272 may travel about one-tenth of the distance that bullets 258 travel.

Figure 14:
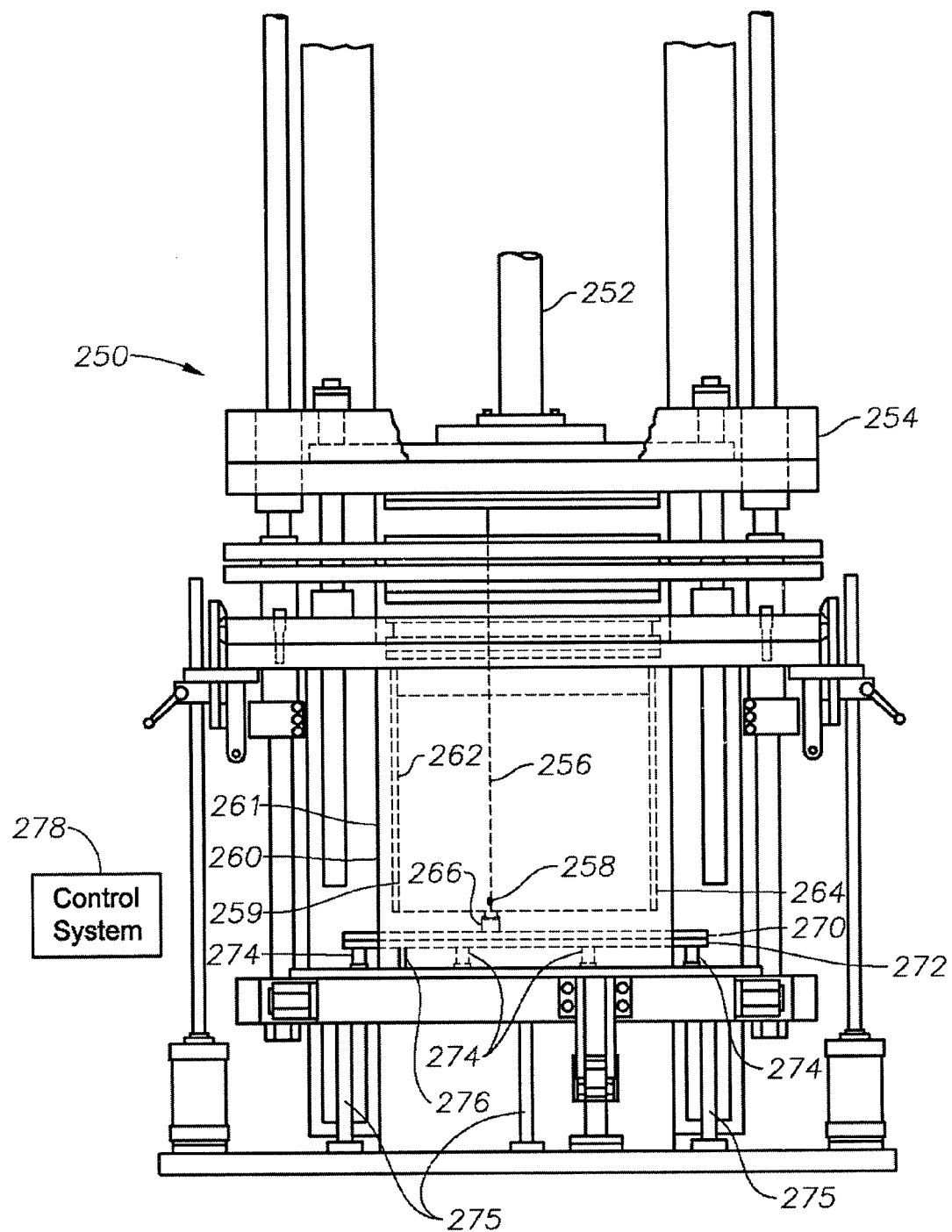
FIG. 14 is a front elevation of the hairpin expander of FIG. 13, shown with the expander bullets in a low position and the bolster plate raised by a hydraulic piston-cylinder assembly.

FIGS. 13 and 14 illustrate a second feature of expander 250 according to a preferred embodiment of the invention to aid in the manufacturing of 5 mm or smaller heat exchangers. Hairpin expanders of prior art typically employ a fixture that has a number of front plates and a number of back plates, which are repositioned to accommodate heat exchanger stacks of various lengths, widths and depths. Gaps exist between adjacent front plates and between adjacent back plates. These gaps have not been problematic when expanding ⅜ inch heat exchangers of prior art. Likewise, prior art expander fixtures have short, individual side rail segments that mount to front plates or back plates. Only one or 2 side rail segments are typically used per side, which act only as a guide for centering the stack with the fixture.

However, because of the large hairpin forces involved in expanding 5 mm heat exchangers, hairpins 22' are prone to buckle in the regions where there are gaps in the fixture. Therefore, as illustrated in FIGS. 13 and 14, fixture 259 includes a continuous, full length, full width front plate 260 and a continuous, full length, full width back plate 261. Likewise, fixture 259 includes full length continuous side rails 262, 264. The continuous full length side rails in cooperation with the continuous full length front and back plates provide lateral support 360 degrees around the entire stack of fins to prevent buckling. Although the front and back plates 260, 261 and left and right side rails 262, 264 are described as full length, in practice this means that they extend to at least within a few inches of the heat exchanger top end plate and/or heat exchanger bottom end plate.

According to the preferred embodiment of the invention, expander 250 includes a novel clamping apparatus. During the controlled-shrink-rate expansion process, tremendous forces may be placed on the heat exchanger bottom end plate, particularly for large 5 mm heat exchangers. The large forces are problematic, because the prior art piano hinge clamp fixture 168 (FIGS. 7-8) that is typically provided with the Crown Unlimited Machine expander is unable to hold the bottom end plate during expansion.

Figure 6:
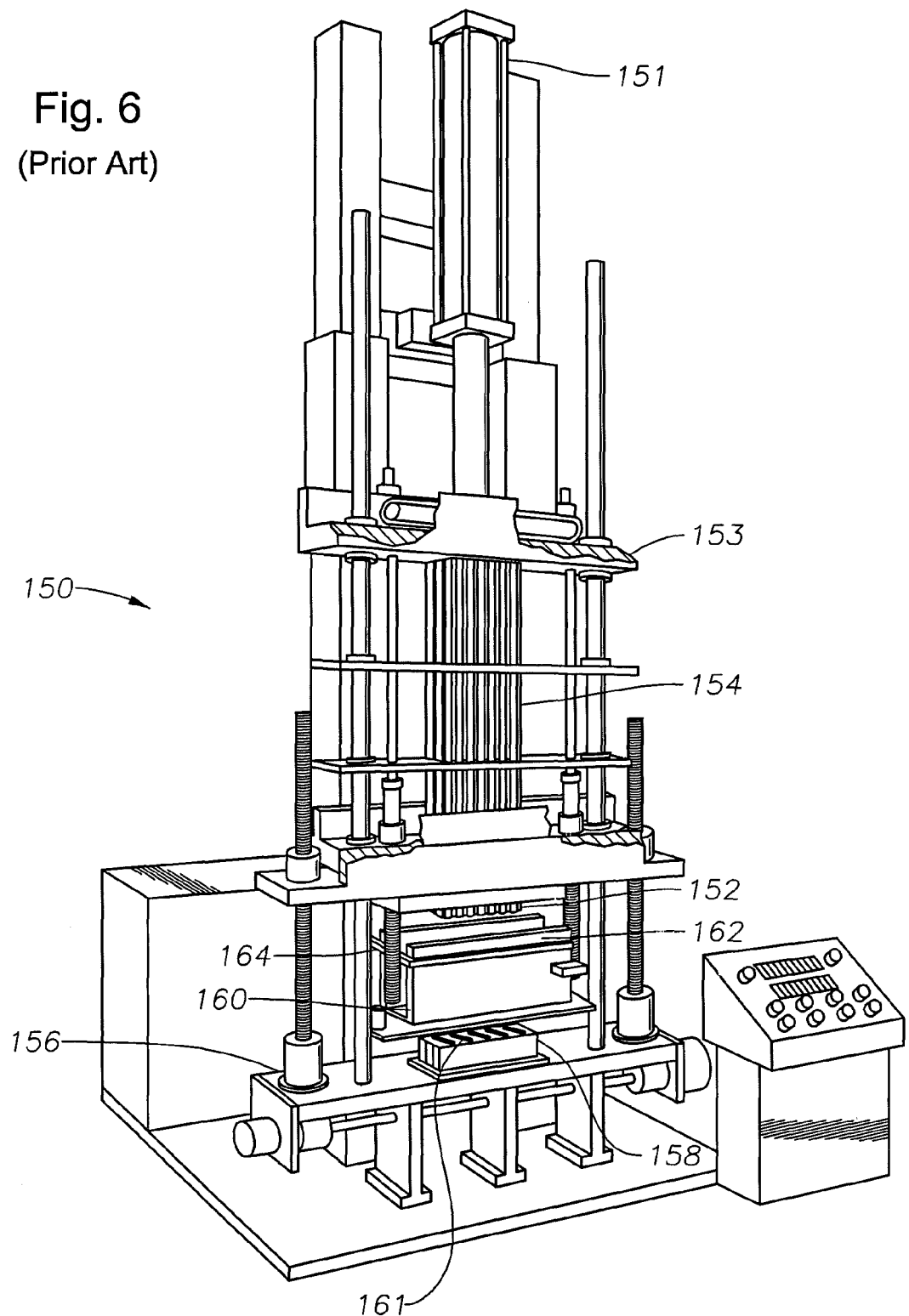
FIG. 6 is perspective view of a typical vertical hairpin expander of prior art, showing a ram cylinder, a pressure plate, hairpin rods and bullets used to enter and expand hairpin tubes.
Figure 7:
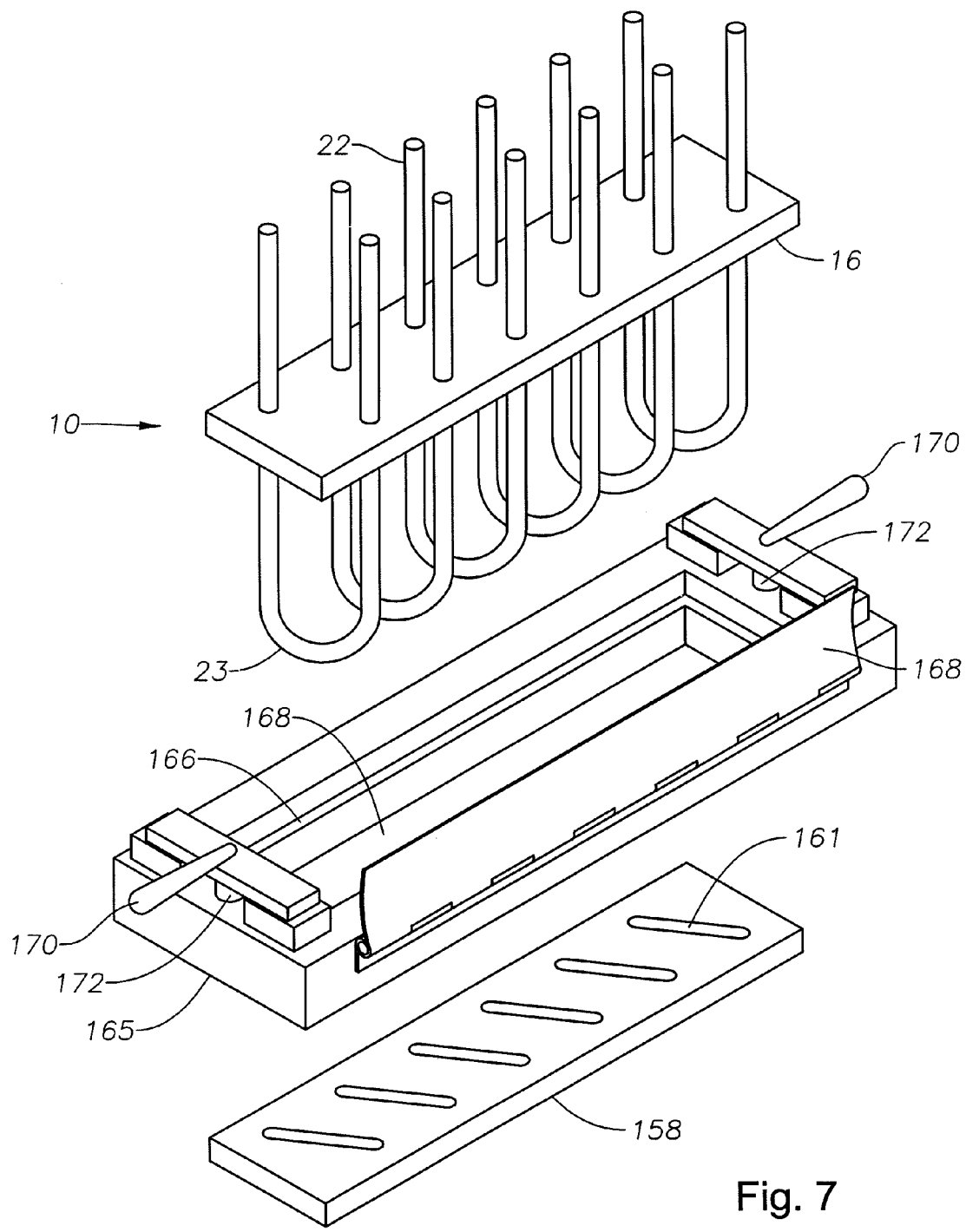
FIG. 7 is a perspective view of a portion of the fixture of a controlled-shrink rate expander of prior art, showing the bottom end of a heat exchanger for positioning within a recessed seat in a base of the fixture plate and a piano hinge clamp that is designed to fold over the seated bottom end plate to hold it fast within the fixture base plate.
Figure 8:
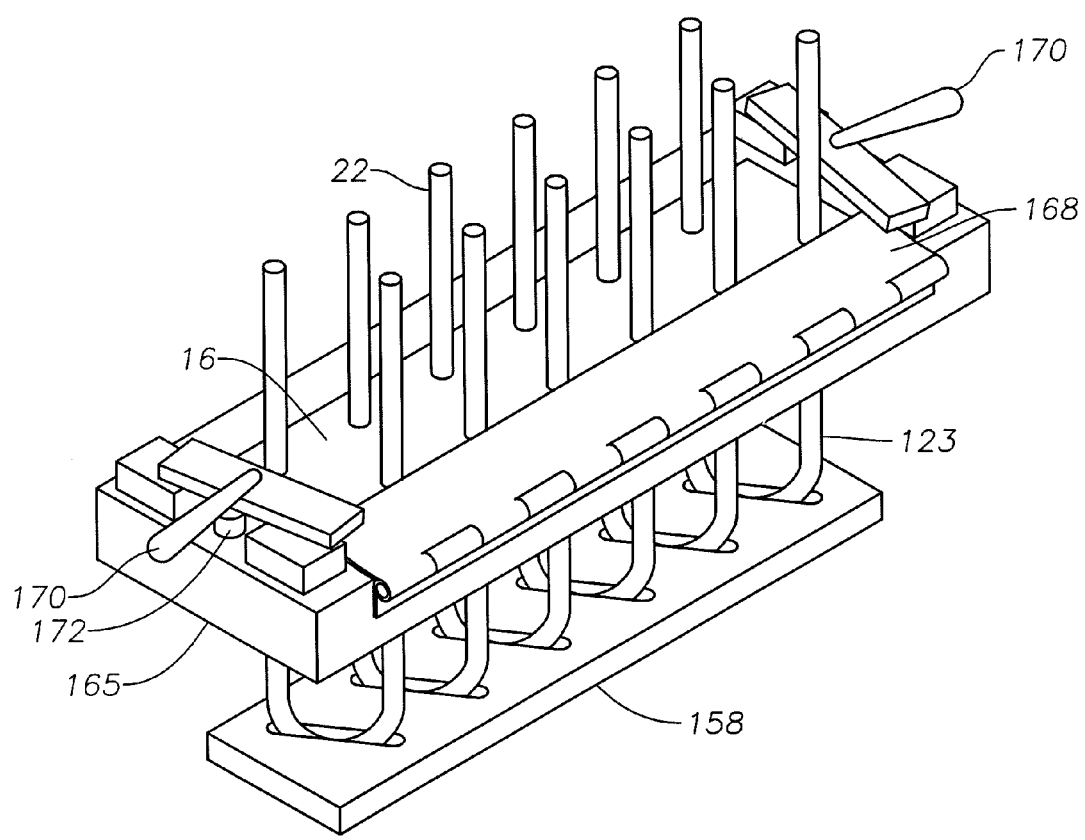
FIG. 8 is a perspective view of the fixture base plate assembly of FIG. 7 showing the heat exchanger bottom end plate clamped within the fixture base plate.
Figure 15:
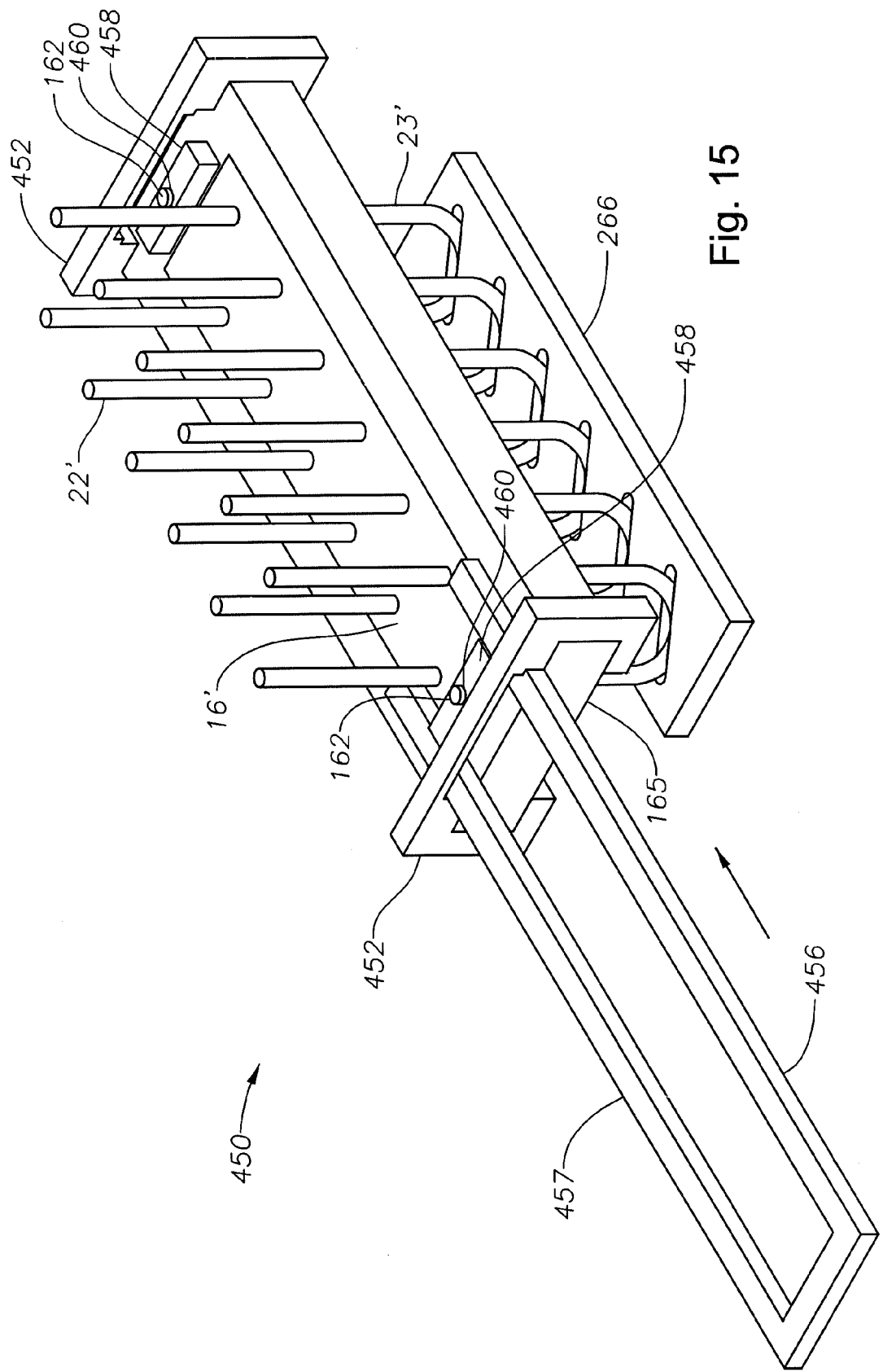
FIG. 15 is a perspective view of an improved bottom end plate clamp assembly according to a preferred embodiment of the invention for use with the expander of FIGS. 13 and 14 in place of the traditional piano-hinge clamp mechanism of FIGS. 7-8, showing a pair of bridges mounted to a fixture base plate and a fork that slides between the bridges and the base plate for clamping the bottom end plate.
Figure 16:
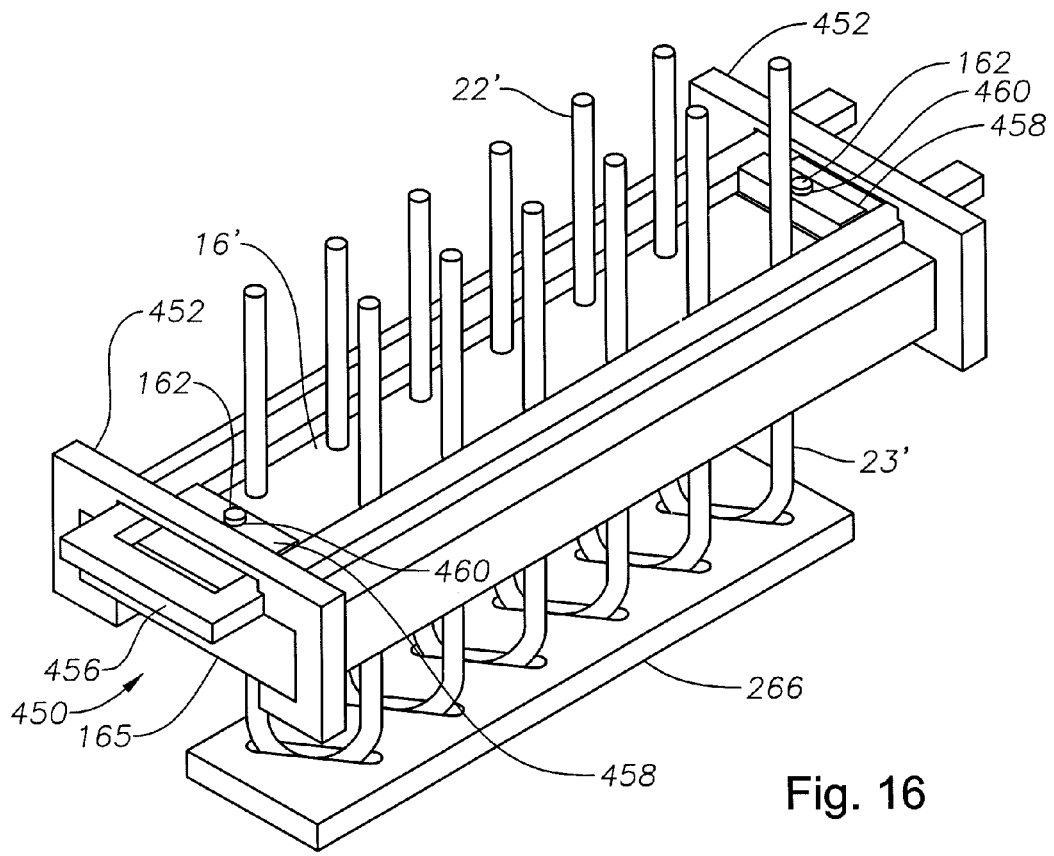
FIG. 16 is a perspective view of the improved bottom end plate clamp assembly of FIG. 15, showing the fork positioned in the clamping position, capturing the heat exchanger bottom end plate within a recessed seat of the fixture base plate.

FIGS. 15 and 16 illustrate an improved clamping fixture 450 according to a preferred embodiment of the invention that replaces the prior art piano clamp 168 of FIGS. 7-8. Clamp 450 includes two bridges 452, which are mounted to the existing base plate 165 of a Crown Unlimited Machine Inc. expander, which is part of fixture 259 (FIGS. 13-14). Bridges 452 remain attached to base plate 165 regardless of whether or not a heat exchanger is clamped within expander 250. Once a heat exchanger bottom end plate 16' is received into the recessed seat in base plate 165, a U-shaped fork member 456 is simply slid under both bridges 452 to secure heat exchanger bottom end plate 16' in place. Fork 456 has a slot 457 that accommodates the hairpin tubes 22' of the heat exchanger. When it is desired to remove the heat exchanger, fork 456 is slid out of engagement from under bridges 452. Two blocks 458 with an aperture 460 formed in each are preferably received onto the studs 162 (see also FIGS. 6-7) and within slot 457 of fork 456. Clamping fixture 450 provides a robust clamp required for 5 mm heat exchanger manufacture.

Figure 17:
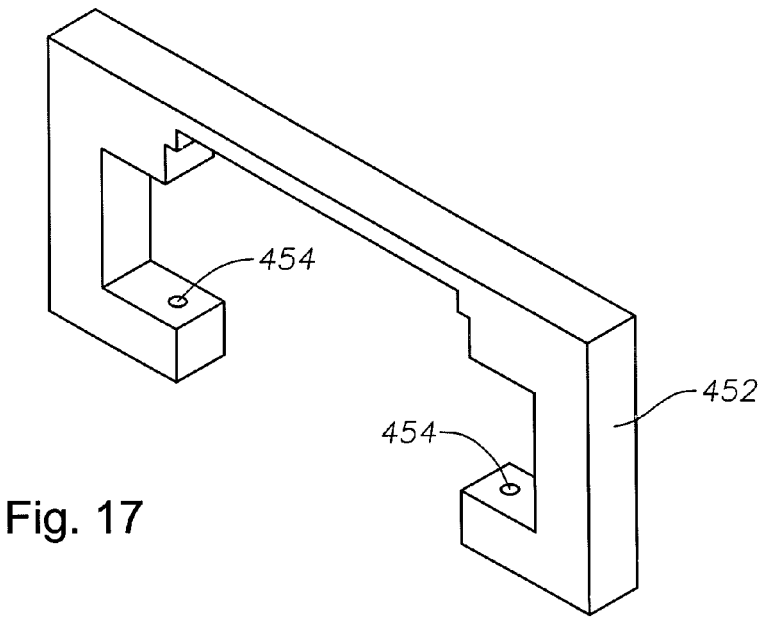
FIG. 17 is a detailed perspective view of one of the bridges of FIGS. 15 and 16.

FIG. 17 illustrates a bridge 452 of clamp 450. Each bridge 452 may include holes 454 that allow the bridge to be bolted on to base plate 165.

Figure 1:
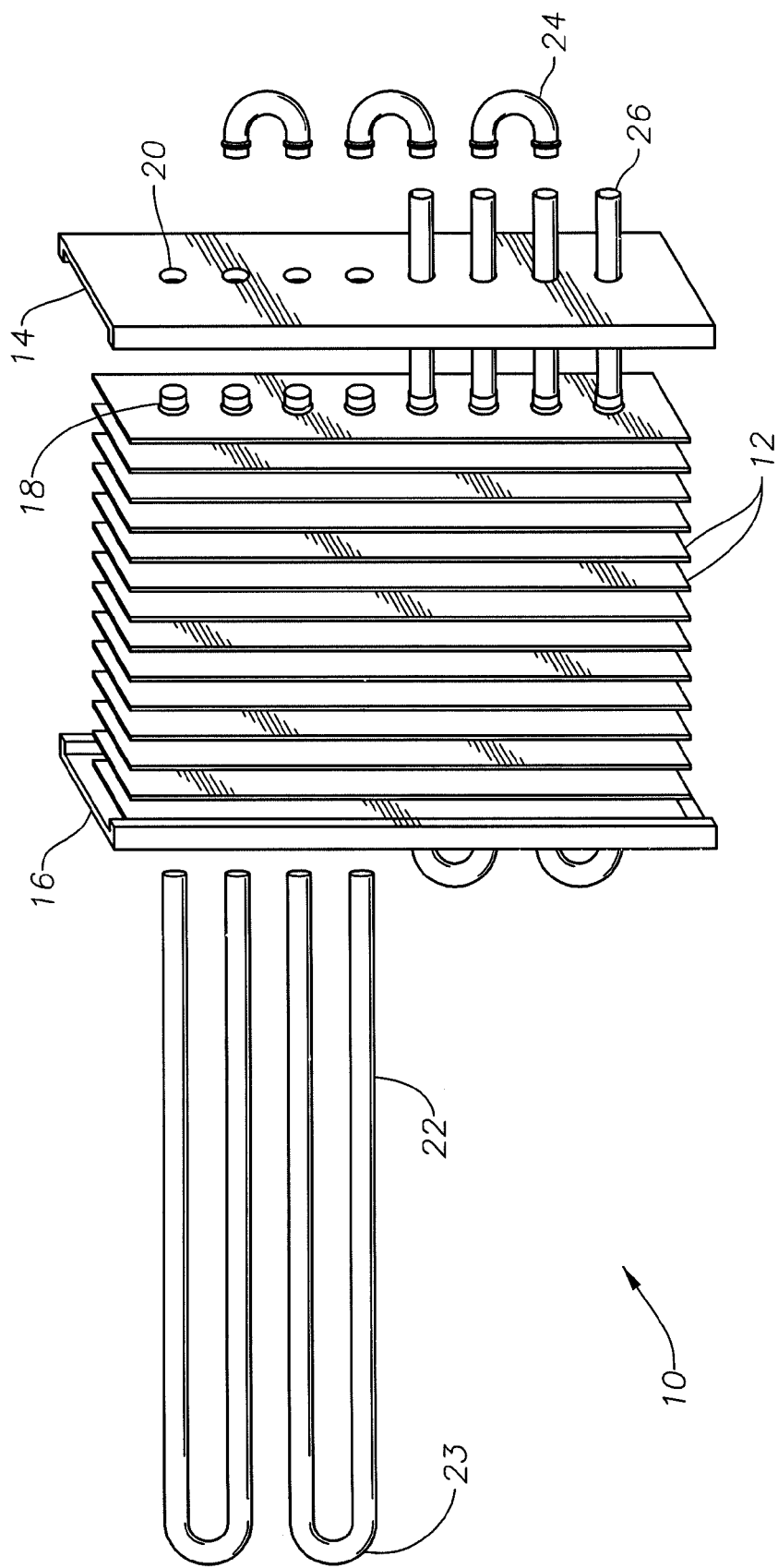
FIG. 1 is a perspective view of a typical tube and fin heat exchanger of prior art.
Figure 18:
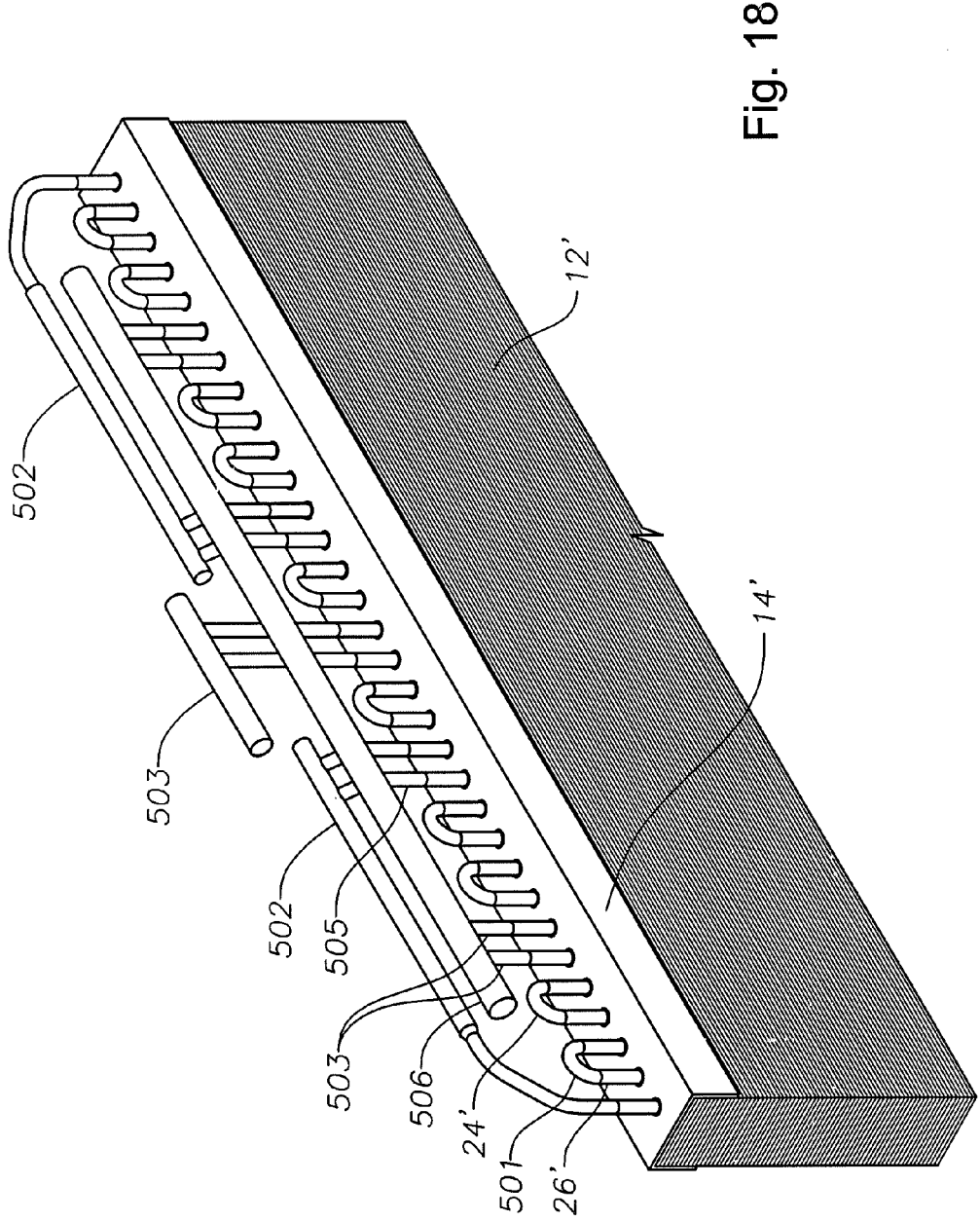
FIG. 18 is a perspective view of the top end of an HVAC heat exchanger condenser coil manufactured according to the preferred embodiment of the invention, showing return bend fittings and manifolds brazed to the hairpin tubes in a single autobrazing process.

Referring collectively to FIGS. 9 and 18, after the hairpin expansion step 204, an autobrazing step 206 is performed according to the preferred embodiment of the invention. In conventional ⅜ inch autobrazing, only the return bends 24 (FIG. 1) and cross-over fittings are included. According to the preferred embodiment, in step 206, subcooler manifolds 502, liquid manifold 503, and suction manifold 506 are also brazed in the autobraze process with the return bends 24'. This process step eliminates manpower variation associated with manual brazing in the downstream assembly step 64 (FIG. 2) and reduces leaks. Step 206 has the added benefit of allowing more efficient leak testing, because all circuits can be tested simultaneously in step 62' rather than having to test each fluid circuit individually, one at a time.

Due to the increased mass of copper in the elongated manifold legs versus the smaller return bend fittings, braze rings characterized by a lower melting temperature are used on the manifold legs. Braze rings on return bends 24' are preferably BCuP-2 equivalent, with a melting temperature of 1310° F. Braze rings on legs of manifolds 502, 503, 506 are preferably BCu-P4 equivalent, with a melting point of 1190° F.

For example, referring to FIG. 18, a heat exchanger top end plate 14' as manufactured according to the preferred embodiment of the invention is shown. Upper tips 26' of 5 mm hairpin tubes extend beyond top end plate 14'. Return bend fittings 24' are brazed to upper tips 26' at exemplar joints 501 using the higher temperature braze rings. The legs of subcooler manifold 502, liquid manifold 503, and suction manifold 506 are brazed to upper tips 26' at exemplar joints 505, 504 and 507, respectively, using the lower temperature braze rings.

Referring back to FIG. 9, at step 62', a leak check by pressure decay measurement is performed in a manner similar to that of step 62 of FIG. 2, except that because subcooler, liquid and suction manifolds 502, 503, 506, respectively, are included in the autobrazing step 206, all of the circuits are checked simultaneously instead of individual circuits checked one at a time. A pressure decay tester forces dry air at high pressure into a port of a condenser coil, with the remaining ports of the coil sealed with quick-disconnect mechanical plugs. After a brief period of settle time, the pressure inside the coil is measured over time for a pressure drop, which would be indicative of a leak.

According to a preferred embodiment of the invention, a blockage test 208 is performed using the same pressure decay measurement equipment that is used to perform the leak check 62'. Blockage is not tested in the manufacturing process of prior art. Smaller diameter tubing is more susceptible to blockage from liquid braze material flowing beyond the brazed joint and collecting in the tubing during the autobrazing process 206. The pressure decay tester is connected to an input port of the coil, but the exit port of the coil, for example, the liquid manifold, is left open, vented to atmosphere. The pressure decay tester injects high pressure air into the coil, and the pressure sensed by the pressure decay tester is measured. A normally unblocked coil will maintain an internal pressure in this arrangement due to natural restrictions in the coil from return bends, changes in tubing diameter, and the long length of the small diameter circuit. For example, a particular, unblocked 5 mm coil subjected to a charge of 325 psi dry air will maintain an internal pressure of 190-195 psi. If there is a blockage or partial blockage in the coil, the sensed pressure will be at an increased level.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. In a hairpin expander machine (250) for the manufacture of tube and fin heat exchangers (10), said hairpin expander machine (250) having (a) a fixture (259) for holding a heat exchanger assembly, which includes a loose stack of fins (12') disposed between top and bottom end plates (14, 16) and at least one hairpin tube (22) laced through the stack of fins (12') and the top and bottom end plates (14, 16), (b) a first actuator (252) coupled between said fixture (259) and at least one rod (256) so as to forcefully drive said at least one rod (256) within said at least one hairpin tube (22) to enlarge the diameter of said at least one hairpin tube (22), and (c) a second actuator (274) coupled between said fixture (259) and a bolster plate (272) so as to support said at least one hairpin tube (22) at its bent end (23) during expansion, the improvement comprising:
  a base plate (165) having a recessed seat (166) formed therein for receiving said bottom end plate (16) of said heat exchanger assembly (10);
  first and second bridges (452) immovably fixed to said base plate (165) and defining first and second openings between said base plate (165) and said first and second bridges (452), respectively; and
  a retaining member (456) arranged to be received within said first and second openings and dimensioned so that when said bottom end plate (16) of said heat exchanger assembly (10) is seated in said recessed seat (166) of said base plate (165), said bottom end plate (16) cannot be removed from said recessed seat (166) while said retaining member (456) remains received within said first and second openings; wherein
  said retaining member (456) is slidingly receivable within said first and second openings.

2. The hairpin expander (250) machine of claim 1 wherein:
  said retaining member (456) is a 'U'-shaped fork that defines a slot (457) that accommodates said at least one hairpin tube (22) of said heat exchanger assembly (10).

3. In a hairpin expander machine (250) for the manufacture of tube and fin heat exchangers (10), said hairpin expander machine (250) having (a) a fixture (259) for holding a heat exchanger assembly, which includes a loose stack of fins (12') disposed between top and bottom end plates (14, 16) and at least one hairpin tube (22) laced through the stack of fins (12') and the top and bottom end plates (14, 16), (b) a first actuator (252) coupled between said fixture (259) and at least one rod (256) so as to forcefully drive said at least one rod (256) within said at least one hairpin tube (22) to enlarge the diameter of said at least one hairpin tube (22), and (c) a second actuator (274) coupled between said fixture (259) and a bolster plate (272) so as to support said at least one hairpin tube (22) at its bent end (23) during expansion, the improvement comprising:
  a base plate (165) having a recessed seat (166) formed therein for receiving said bottom end plate (16) of said heat exchanger assembly (10);
  first and second bridges (452) immovably fixed to said base plate (165) and defining first and second openings between said base plate (165) and said first and second bridges (452), respectively; and
a retaining member (456) arranged to be received within said first and second openings and dimensioned so that when said bottom end plate (16) of said heat exchanger assembly (10) is seated in said recessed seat (166) of said base plate (165), said bottom end plate (16) cannot be removed from said recessed seat (166) while said retaining member (456) remains received within said first and second openings; wherein:
  said retaining member (456) is a 'U'-shaped fork that defines a slot (457) that accommodates said at least one hairpin tube (22) of said heat exchanger assembly (10).

* * * * *